United States Patent Office 3,334,117
Patented Aug. 1, 1967

3,334,117
t-BUTYL 3,3-DIPHENYL-3-p-(METHOXY- OR NITRO)PHENYLPERPROPIONATE
William H. Starnes, Jr., Baytown, Tex., assignor to Esso Research and Engineering Company
No Drawing. Filed Dec. 20, 1966, Ser. No. 603,097
2 Claims. (Cl. 260—389)

This application is a continuation-in-part of Ser. No. 411,593, entitled "Peresters," filed Nov. 16, 1964, now abandoned.

The present invention is directed to new perester compositions of matter. More briefly, the invention is concerned with convenient and safe peresters which are free radical sources. In its more specific aspects, the invention is directed to the thermal decomposition of the peresters of the present invention which undergo a novel rearrangement and cyclization.

The novel peresters of the present invention are t-butyl 3,3-diphenyl-3-p-methoxyphenylperpropionate and t-butyl 3,3-diphenyl-3-p-nitrophenylperpropionate. The peresters may be illustrated by the following formula:

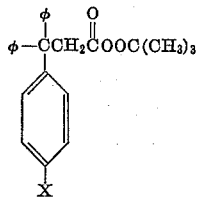

where:
$x$ is $-OCH_3$ or $-NO_2$
$\phi$ is phenyl

The peresters are white, crystalline solids with melting points considerably above room temperatures. The peresters of the present invention cannot be exploded by impact or by vigorous heating, and they are, therefore, much more convenient and safer to handle than most of the peresters described in the art which have been used as free radical sources. Further, both of the peresters of the present invention are soluble in a wide variety of organic solvents, and thus, their utility is not restricted by solubility considerations. The functional methoxy and nitro groups in the peresters of the present invention are important as dyesites or sites for further reaction when the peresters are employed for reactions such as the polymerization of olefins.

The peresters of the present invention are prepared by reaction of the corresponding acyl chlorides with t-butylhydroperoxide in solutions containing pyridine. The requisite acyl chlorides are prepared by treatment of the corresponding acids with thionyl chloride. The corresponding acids from which the peresters are formed are 3,3-diphenyl-3-p-methoxyphenylpropionic acid and 3,3-diphenyl-3-p-nitrophenylpropionic acid. The p-nitro acid was prepared by adapting a procedure which had already been successfully applied to the synthesis of the p-methoxy acid. This procedure comprises alkylation of ethoxymagneseiomalonic ester with the appropriate triaryl halide, followed by saponification and decarboxylation. That the nitro halide could be successfully employed as an alkylating agent is noteworthy in view of the known susceptibility of the nitro group to attack by conventional Grignard reagents.

Another aspect of the present invention is the novel rearrangement and cyclization upon thermal decomposition of the t-butyl peresters derived from 3,3,3-triarylpropionic acids. The thermal decomposition produces a variety of aromatic esters. The aromatic esters produced in these reactions are useful intermediates for organic synthesis and may be used as high-temperature lubricants and alkyd resin modifiers. Saponification of the ester mixtures gives mixtures of acids which may be used as alkyd additives, as well as the corresponding phenols which are easily recovered by steam distillation.

The thermal decomposition of t-butyl 3,3,3-triphenylperpropionate in aromatic or aliphatic organic solvents at temperatures ranging from 80° to 150° C. forms a mixture of products of which phenyl 3,3-diphenylpropionate, phenyl 3,3-diphenylacrylate, phenyl 3,3-diphenyl-2-methylpropionate, and phenyl 3,3-diphenyl-2-methylacrylate are formed by the novel rearrangement of this invention; and 4,4-diphenyl-3,4-dihydrocoumarin is the product of the novel cyclization. The t-butyl peresters of 3,3-diphenyl-3-p-methoxyphenylpropionic acid and 3,3-diphenyl-3-p-nitrophenylpropionic acid react similarly.

The present invention will be further described by the following examples which are intended to illustrate and not limit the present invention:

EXAMPLE I

Preparation of t-butyl 3,3-diphenyl-3-p-methoxyphenylperpropionate: A solution of t-butylhydroperoxide (95% pure by iodometric titration, 5.46 g., 0.0600 mol) and anhydrous pyridine (4.74 g., 0.0600 mol) is anhydrous benzene (75 ml.) was stirred at 2–5° C. while a solution in benzene (75 ml.) of the crude acyl chloride resulting from the reaction of 3,3-diphenyl-3-p-methoxyphenylpropionic acid (10.00 g., 0.0301 mol) with an excess of thionyl chloride was added slowly during 65 minutes. Stirring was continued for 5 hours, during which time the temperature gradually rose to 20° C. The mixture was then washed in succession with ice-cold 10% sulfuric acid (100 ml.), ice-cold saturated sodium carbonate solution (two 50-ml. portions), and ice water (two 50-ml. portions). After having been dried in the refrigerator with Drierite overnight, the organic phase was filtered and evaporated on a rotary evaporator at reduced pressure to give 11.52 g. of a viscous orange oil, which was extracted by boiling with approximately 200 ml. of petroleum ether (B.P. 30–60° C.). Upon chilling, the extract deposited 6.28 g. of the crude perester, M.P. 81–83.5° C. Two recrystallizations of this material from petroleum ether afforded 4.28 g. (35% yield) of the pure product as snow-white clusters of needles, M.P. 84–84.8° C. The n.m.r. and infrared spectra and the elemental analysis of the compound were consistent with the proposed structure.

EXAMPLE II

Preparation of 3,3-diphenyl-3-p-nitrophenylpropionic acid: A solution of diphenyl-p-nitrophenylbromomethane (62.15 g., 0.169 mole) in 250 ml. of benzene was stirred at room temperature for 13 hr. while an equivalent amount of diethyl ethoxymagnesiomalonate in benzene (184.5 ml. of 0.916 M solution) was added dropwise. After an additional 9 hr. of stirring, the mixture was heated to reflux for 5 min., cooled to room temperature, and shaken with an ice-cold solution of concentrated hydrochloric acid (50 ml.) in water (200 ml.). The aqueous layer was extracted with two 100-ml. portions of ether, and the combined organic layers were washed with two 100-ml. portions of saturated aqueous sodium chloride solution, dried over Drierite, and evaporated under vacuum to afford 84.8 g. of the crude malonic ester derivative as a viscous, orange-red oil. This oil was saponified by refluxing and stirring for 6 hrs. with 75 g. of potassium hydroxide, 75 ml. of water, and 650 ml. of 95% ethanol. Evaporation of the ethanol under vacuum left a dark residue, which was taken up in approximately 1500 ml. of water. The aqueous solution was extracted with 1250 ml. of ether in five portions, warmed to expel dissolved ether, cooled, and then poured slowly into a well-stirred mixture of concentrated hydrochloric acid (275 ml.) and several hundred grams of cracked ice. Carbon dioxide escaped from the mixture as it warmed gradually to room temperature. When gas evolution appeared to be complete, the pale green solid was recovered by suction filtration, washed with several portions of water, and dried in vacuo at 50° C. This solid was purified by repeated chromatography on activated silicic acid using chloroform for elution. The material thus obtained was found to exist in two different crystalline forms melting at 164–165° or at 194–195° C. Recrystallization from a mixture of benzene and petroleum ether (B.P. 30–60° C.) using the higher-melting form for seeding gave 15.48 g. (26% yield) of purified 3,3-diphenyl-3-p-nitrophenylpropionic acid, which melted at 194–195° C. after a further recrystallization from aqueous ethanol. The structure of the product was established by elemental analysis and by infrared and n.m.r. spectra.

EXAMPLE III

Preparation of t-butyl 3,3-diphenyl-3-p-nitrophenylperpropionate: This perester was prepared in the manner descried in Example I by allowing a solution in dry benzene (50 ml.) of the crude acyl chloride formed from thionyl chloride and 3,3-diphenyl-3-p-nitrophenylpropionic acid (8.000 g., 0.0230 mol) to react at 4–7° C. with 95% t-butyl hydroperoxide (4.36 g., 0.0460 mol) and anhydrous pyridine (3.64 g., 0.0460 mol) in dry benzene (50 ml.). The organic layer was worked up to afford 8.47 g. (88% yield) of crude product, M.P. 150–152° C. Two recrystallizations from methanol gave the pure substance as shiny, pale yellow flakes, M.P. 155.5–156.2° C. (with decomposition). The infrared and n.m.r. spectra and the elemental analysis were in agreement with the structure proposed.

EXAMPLE IV

A solution of t-butyl 3,3,3-triphenylperpropionate (0.4966 g., 0.001326 mol) in anhydrous chlorobenzene (10.0 ml.) was thoroughly degassed by repeated freezing, evacuation, and thawing. The solution was blanketed with helium and heated with stirring at 100° C. for 64 hours. Solvent and low-boiling products were removed by vacuum distillation; then the residue was dissolved in ether and extracted with enough 1 N aqueous sodium carbonate to remove all of the 3,3,3-triphenylpropionic acid (23.6% yield) formed in the reaction. The ether layer was dried over anhydrous calcium sulfate and evaporated to give a neutral residue which was analyzed by programmed temperature gas chromatography. The analytical results are given in the following table.

| Compound: | Yield, percent |
|---|---|
| Phenyl 3,3-diphenylpropionate | 22.3 |
| Phenyl 3,3-diphenylacrylate | 17.5 |
| Phenyl 3,3-diphenyl-2-methylpropionate | 4.1 |
| Phenyl 3,3-diphenyl-2-methylacrylate | 3.6 |
| 4,4-diphenyl-3,4-dihydrocoumarin | 4.1 |
| 1,1,2-triphenylethane | 6.6 |
| Triphenylethylene | 12.3 |
| t-Butyl 2,2,2-triphenylethyl ether | 3.2 |
| Benzophenone | 0.6 |
| Phenol | 0.6 |

EXAMPLE V

Decomposition of t-butyl 3,3-diphenyl-3-p-methoxyphenylperpropionate was carried out according to the procedure outlined in Example IV. Saponification of the neutral residue, followed by quantitative ether extraction, gave a mixture of acidic meterials which was shown by gas chromatographic (G.C.) analysis to contain considerable quantities of phenolic material. The molar composition of the phenolic fraction was shown to be 34% phenol, 66% p-methoxyphenol.

EXAMPLE VI

Decomposition of t-butyl 3,3-diphenyl-3-p-nitrophenylperpropionate according to Example IV, followed by the work-up procedure used for Example IV, gave a phenolic fraction containing 89 mol percent phenol and 11 mol percent p-nitrophenol.

The nature and object of the present invention having been completely described and illustarted and the best mode thereof contemplated set forth, what I wish to claim as new and useful and secure by Letters Patent is:

1. t - Butyl 3,3-diphenyl - 3 - p-methoxyphenylperpropionate.
2. t-Butyl 3,3-diphenyl-3-p-nitrophenylperpropionate.

No references cited.

CHARLES B. PARKER, *Primary Examiner.*

JOSEPH P. BRUST, *Examiner.*